United States Patent
Wang et al.

(10) Patent No.: US 7,301,675 B2
(45) Date of Patent: Nov. 27, 2007

(54) GLOSSMARK IMAGES WITH CLEAR TONER

(75) Inventors: Shen-Ge Wang, Fairport, NY (US); Chu-Heng Liu, Penfield, NY (US); Beilei Xu, Penfield, NY (US)

(73) Assignee: Xerox Corporation, Stamford, CT (US)

(*) Notice: Subject to any disclaimer, the term of this patent is extended or adjusted under 35 U.S.C. 154(b) by 765 days.

(21) Appl. No.: 10/879,684

(22) Filed: Jun. 29, 2004

(65) Prior Publication Data
US 2005/0286083 A1    Dec. 29, 2005

(51) Int. Cl.
*H04N 1/405* (2006.01)
*B41M 3/10* (2006.01)

(52) U.S. Cl. .................. 358/3.06; 358/3.2; 358/3.28

(58) Field of Classification Search ............. 358/1.9, 358/3.06, 3.13–3.2, 3.26–3.28, 533–536; 382/237, 270; 428/195.1; 399/341–342
See application file for complete search history.

(56) References Cited

U.S. PATENT DOCUMENTS

| | | | |
|---|---|---|---|
| 3,196,765 A | 7/1965 | Walkup | 95/1.7 |
| 3,317,317 A | 5/1967 | Clark | 96/1.4 |
| 3,782,932 A | 1/1974 | Tulagin | 96/1.3 |
| 3,784,289 A * | 1/1974 | Wicker | 283/93 |
| 4,040,828 A | 8/1977 | Evans | 96/1.2 |
| 4,149,194 A * | 4/1979 | Holladay | 358/3.16 |
| 4,210,346 A | 7/1980 | Mowry, Jr. et al. | 283/8 B |
| 4,310,180 A | 1/1982 | Mowry, Jr. et al. | 283/8 B |
| 5,087,507 A | 2/1992 | Heinzer | 428/195 |
| 5,487,567 A | 1/1996 | Volpe | 283/72 |
| 5,583,660 A | 12/1996 | Rylander | 358/3.17 |
| 5,612,777 A | 3/1997 | Malhotra | 399/226 |
| 5,678,133 A | 10/1997 | Siegel | 399/67 |
| 5,695,220 A | 12/1997 | Phillips | 283/91 |
| 5,710,636 A * | 1/1998 | Curry | 358/3.28 |
| 5,734,752 A | 3/1998 | Knox | 382/212 |
| 5,788,285 A | 8/1998 | Wicker | 283/93 |
| 5,804,341 A | 9/1998 | Bohan et al. | 430/12 |

(Continued)

FOREIGN PATENT DOCUMENTS

EP    0 859 506 A1    8/1998

(Continued)

OTHER PUBLICATIONS

Shen-ge Wang et al., U.S. Appl. No. 10/159,432, filed May 30, 2002, entitled "Application of Glossmarks for Graphics Enhancement" (D/A1744).

(Continued)

*Primary Examiner*—Scott A. Rogers
(74) *Attorney, Agent, or Firm*—Christopher D. Wait

(57) ABSTRACT

The present invention relates to creating differential gloss images in clear toner by the manipulation of halftones employed prior to the depositing of the clear toner layer upon a substrate. By selectively applying halftones with anisotropic structure characteristics which are significantly different in orientation although remaining identical in density, a differential gloss image may be superimposed within even clear toner as applied to paper. Further, this technique may be used to enhance color toner Glossmark images across the low and high density areas of application where the differential gloss effect would otherwise be weak.

21 Claims, 3 Drawing Sheets

U.S. PATENT DOCUMENTS

| | | | |
|---|---|---|---|
| 5,847,738 A | 12/1998 | Tutt et al. | 347/101 |
| 5,853,197 A | 12/1998 | Mowry, Jr. et al. | 283/91 |
| 5,926,679 A | 7/1999 | May et al. | 399/296 |
| 5,981,121 A | 11/1999 | Ide | 430/45 |
| 6,108,512 A | 8/2000 | Hanna | 399/366 |
| 6,428,148 B1 | 8/2002 | Gore | 347/55 |
| 6,580,890 B2 | 6/2003 | Phillips et al. | 399/222 |
| 6,606,168 B1* | 8/2003 | Rylander | 358/3.09 |
| 6,714,320 B1* | 3/2004 | Nakahara et al. | 358/3.13 |
| 6,723,767 B2 | 4/2004 | Lin et al. | 524/91 |
| 6,763,121 B1* | 7/2004 | Shaked et al. | 382/100 |
| 6,906,825 B1* | 6/2005 | Nakahara et al. | 358/1.9 |
| 7,020,349 B2* | 3/2006 | Brunk | 382/289 |
| 7,092,128 B2* | 8/2006 | Wang et al. | 358/3.06 |
| 7,126,721 B2* | 10/2006 | Wang et al. | 358/3.06 |
| 7,139,101 B2* | 11/2006 | Loce et al. | 358/3.06 |
| 7,148,999 B2* | 12/2006 | Xu et al. | 358/3.06 |
| 7,180,635 B2* | 2/2007 | Wang et al. | 358/3.06 |
| 7,193,751 B2* | 3/2007 | Wang et al. | 358/3.06 |
| 2005/0025333 A1* | 2/2005 | Fujii et al. | 382/100 |
| 2005/0031160 A1* | 2/2005 | Shaked et al. | 382/100 |
| 2005/0128523 A1* | 6/2005 | Liu et al. | 358/3.06 |
| 2005/0128524 A1* | 6/2005 | Liu et al. | 358/3.06 |
| 2006/0044617 A1* | 3/2006 | Wang et al. | 358/3.06 |
| 2006/0072159 A1* | 4/2006 | Eschbach et al. | 358/3.06 |
| 2006/0127117 A1* | 6/2006 | Eschbach et al. | 399/67 |

FOREIGN PATENT DOCUMENTS

| | | |
|---|---|---|
| EP | 1705531 A1 * | 9/2006 |
| GB | 2 217 258 A | 10/1989 |

OTHER PUBLICATIONS

Shen-ge Wang et a., U.S. Appl. No. 10/159,423, filed May 30, 2002, entitled "Halftone Image Gloss Control for Glossmarks" (D/A1749).

Beilei Xu et al., U.S. Appl. No. 10/186,065, filed Jun. 27, 2002, entitled "Variable Glossmark" (D/A1745).

Chu-heng Liu et al., U.S. Appl. No. 60/529,187, filed Dec. 12, 2003, entitled "Enhancement of Glossmark Images at Low and High Densities" (A1742-US-NP).

* cited by examiner

GLOSSMARK IMAGES WITH CLEAR TONER

CROSS-REFERENCE TO RELATED APPLICATIONS

Cross reference is made to the following applications, the disclosures of each of which are totally incorporated by reference herein: U.S. patent application Ser. No. 10/159,423 now U.S. Pat. No. 7,180,635B2 entitled "HALFTONE IMAGE GLOSS CONTROL FOR GLOSSMARKS" to inventors Shen-ge Wang, Beilei Xu, and Chu-heng Liu; U.S. patent application Ser. No. 10/159,432 now U.S. Pat. No. 7,092,128B2 entitled "APPLICATION OF GLOSSMARKS FOR GRAPHICS ENHANCEMENT" to inventors Shen-ge Wang, Beilei Xu, and Chu-heng Liu; U.S. patent application Ser. No. 10/186,065 now U.S. Pat. No. 7,148,999B2 entitled "VARIABLE GLOSSMARK" to inventors Beilei Xu, Shen-ge Wang, and Chu-heng Liu; U.S. Provisional Application No. 60/529,187 entitled "ENHANCEMENT OF GLOSSMARK IMAGES AT LOW AND HIGH DENSITIES" to inventors Shen-ge Wang, Beilei Xu, and Chu-heng Liu. The appropriate components and processes of the above co-pending applications may be selected for the disclosure of the present application in embodiments thereof.

BACKGROUND AND SUMMARY

The present invention relates generally to the gloss inherent in the hardcopy of image data be it pictorial or text. More particularly, this invention relates to halftoned image data and the control of differential gloss when that halftone image data is printed into hardcopy.

It is desirable to have a way to protect against the copying of a document. Most desirably in a manner that part of the content can be readily observed by a human reader but not by a copier scanner. One approach is where an image is printed using clear toner or ink, creating a difference in reflected light and diffused light that can be discerned by a human reader by holding the paper at an angle, but can not be detected by a copier scanner which is restricted to reading at right angles to the page.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, the invention described discloses a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example in U.S. Pat. No. 5,734,752 to Knox, there is disclosed a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

All of the above are herein incorporated by reference in their entirety for their teaching.

A further problem extant the teachings provided in patent application Ser. No. 10/159,423 entitled "HALFTONE IMAGE GLOSS CONTROL FOR GLOSSMARKS" and incorporated above, is that the rendering of a desired glossmark image is most effective in halftone regions of the print of a primary image where the halftone structures in the primary image can be changed significantly without visual density/color change. In solid coverage (100%) and highlight (low density) regions, the manipulable gloss differential is weak or near zero.

Therefore, as discussed above, there exists a need for an arrangement and methodology which will control differential gloss and allow manipulation for glossmark hardcopy while improving and expanding the range of workable densities over which a Glossmark image technique will be effective for a given primary image. Included in this need is the desirability of generating an image which may not be readily copied yet is readily discernable as such to the unaided observer. Thus, it would be desirable to solve this and other deficiencies and disadvantages as discussed above, with an improved methodology for the manipulation of inherent gloss.

The present invention relates to a method for the manipulation of the differential gloss in a hardcopy output comprising the steps of selecting a first halftone having a first anisotropic structure orientation, and then selecting a second halftone having a second anisotropic structure orientation different from the first halftone. The first halftone being applied to at least one portion of the halftone image, and the second halftone being applied to the remaining portions of the halftone image. This is followed by applying a clear toner to the hardcopy output of the halftone image resulting from the above steps where a first portion of the applied clear toner is provided with a third halftone having a third anisotropic structure orientation and a remaining portion of the applied clear toner is provided with a forth halftone having a forth anisotropic structure orientation.

In particular, the present invention relates to a method for the manipulation of the perceived differential gloss upon a substrate comprising the steps of selecting a first halftone having a first anisotropic structure orientation, selecting a second halftone having a second anisotropic structure orientation different from that of the first halftone, applying the first halftone to a first portion of a clear toner layer deposited upon a substrate and, applying the second halftone to the remaining portion of the clear toner layer deposited upon a substrate.

The present invention also relates to a method for the manipulation of the differential gloss in a hardcopy output comprising the steps of selecting a first halftone having a first anisotropic structure orientation, selecting a second halftone having a second anisotropic structure orientation different from that of the first halftone, applying the first halftone to a first portion of a first clear toner layer deposited upon a substrate and applying the second halftone to the remaining portion of the first clear toner layer deposited upon a substrate. Then this is followed with selecting a third halftone having a third anisotropic structure orientation, selecting a forth halftone having a forth anisotropic structure orientation different from that of the third halftone, applying the third halftone to at least some first portion of a halftone image, applying the forth halftone to the remaining portion of the halftone image, and applying a color toner layer representative of the halftone image comprising the third and forth halftone as deposited upon the first clear toner layer. This is then followed by applying a second clear toner layer to the hardcopy output of the halftone image resulting from the above steps where a first portion of the applied second clear toner layer is provided with a fifth halftone having a fifth anisotropic structure orientation and a remaining portion of the applied second clear toner layer is provided with a sixth halftone having a sixth anisotropic structure orientation.

DETAILED DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks. However, that teaching, as is provided herein below, by its very nature relies upon some toner or ink upon a page for effectiveness. As the technique entails manipulation of the gloss inherent in toner/ink as applied to a media/paper, it directly follows that a given desired glossmark image will be manifest only in those areas where some toner/ink is deposited. Very low density areas such as background areas and highlights will display minimal to zero differential gloss effect, rendering any desired glossmark image placed thereupon invisible due to that absence of gloss, as is in turn due to the absence of toner.

At an opposite toner/ink scenario, where the image is fully saturated and thus requires complete toner coverage, the anisotropic halftone dot gloss structure is lost because halftone dot is fully "on". Thus the anisotropic gloss structure is lost to full saturation. Here again, due to the zero differential gloss in affect, any desired glossmark image placed in any such area thereupon is rendered invisible due to the absence of any anisotropic gloss differential. Thus for best effect, a desired glossmark image is best superimposed over those in-between image areas which are neither very low density, nor very high density. It is to the expansion of this range of workable densities to which the disclosure provided herein below is directed.

Figure 1:
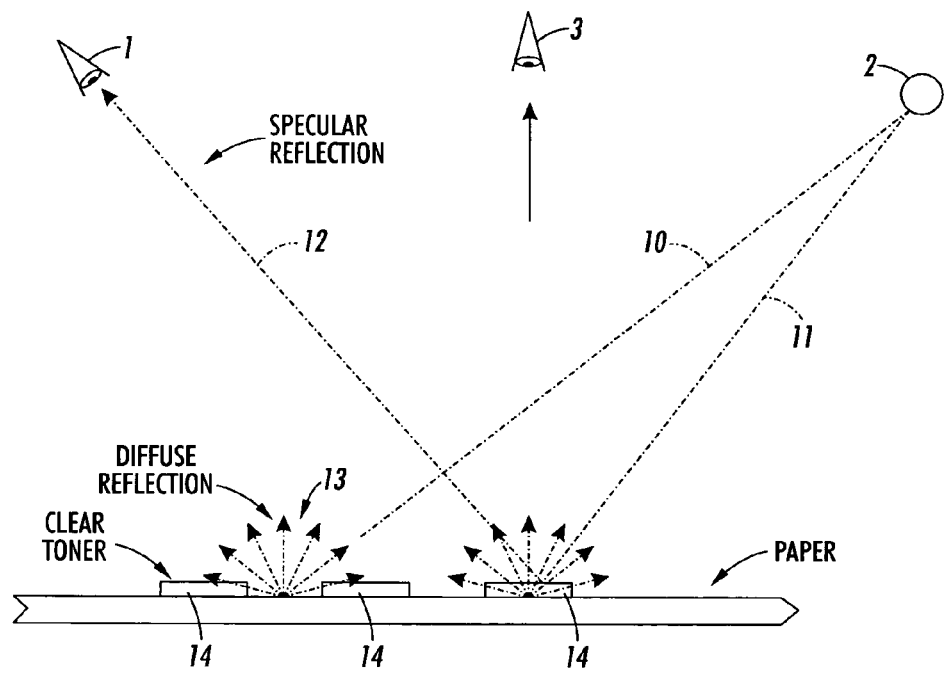
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
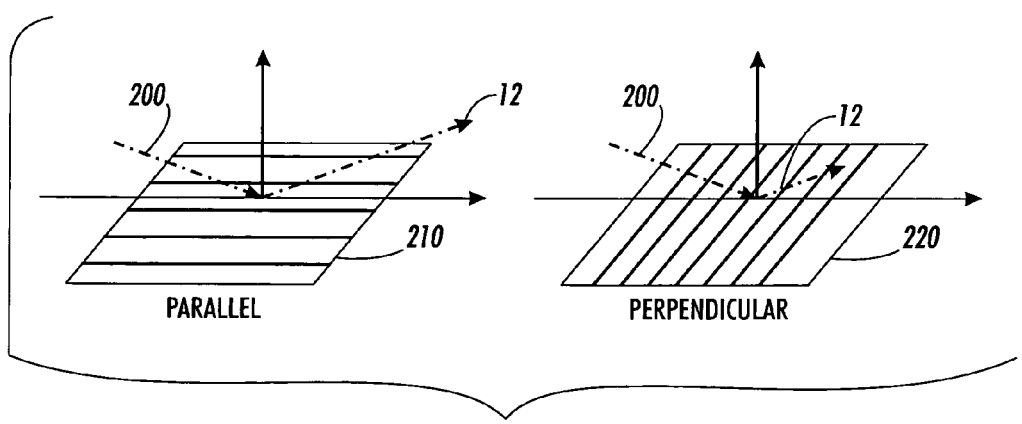
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark image. As is shown here in FIG. 2, the perceptibility of this gloss differential will be maximized when the halftone anisotropic orientations are 90 degrees apart, as opposed to when they are substantially parallel where the gloss differential will be minimized.

Figure 3:
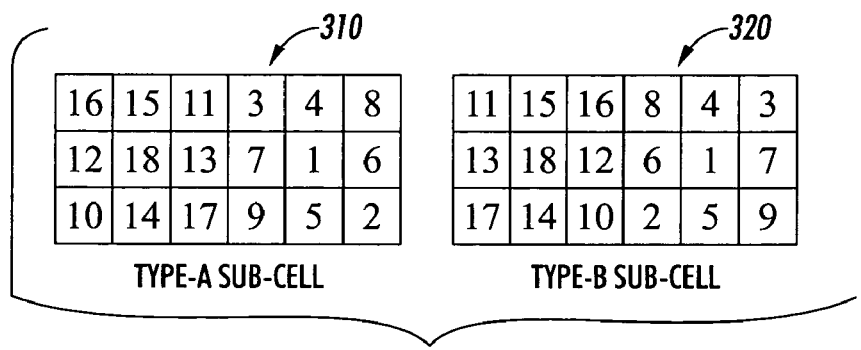
FIG. 3 shows two 3×6 halftone patterns suitable in anisotropic structure to produce discernable gloss differential for practicing the present invention.
Figure 4:
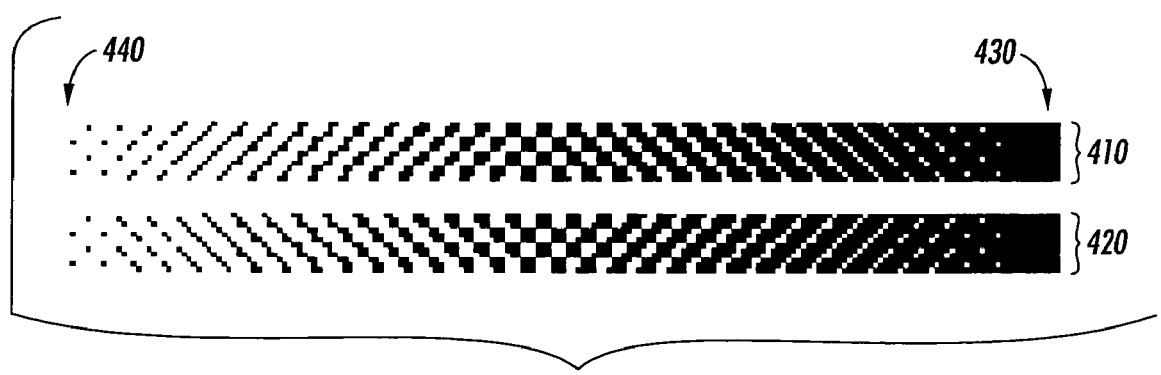
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
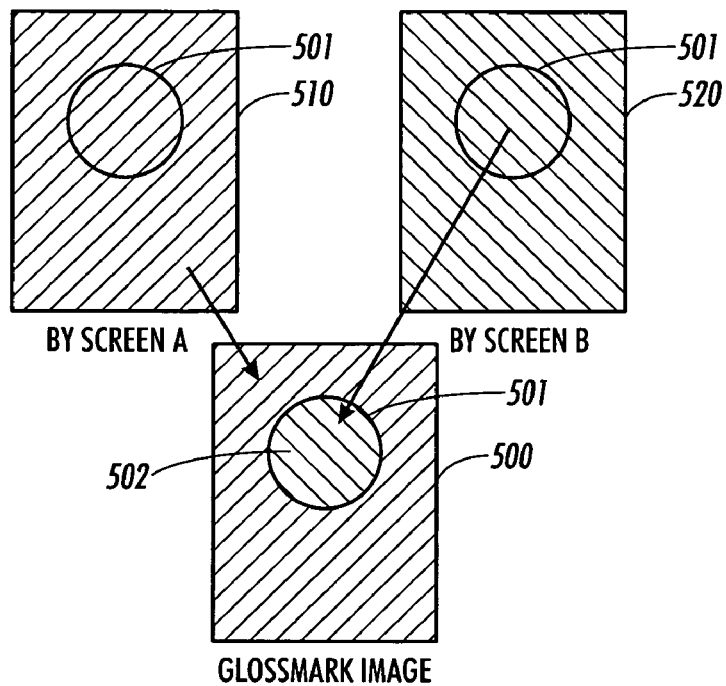
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
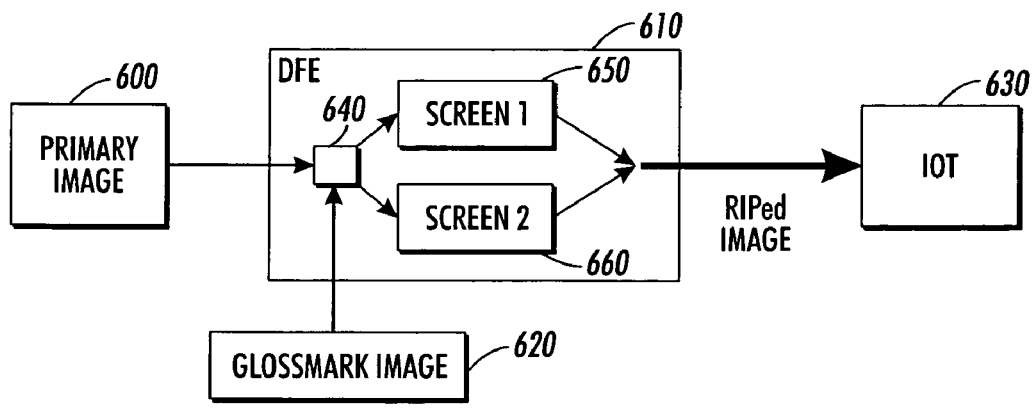
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is gray-scaled, the halftone density being driven by the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as a gloss differential glossmark picture.

By alternating between two halftone types, carefully selected such that each has identical matching density characteristics while displaying distinctly different anisotropic structure orientations will enable the super imposition of a glossmark image without the need for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss, they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent anisotropic gloss differential standing alone will be weak where either there is a solid black area (solid toner/ink) or a white and therefore toner-less/ink-less area. That is because these areas will not best exhibit the anisotropic structures of the selected halftones.

As discussed above the rendering of a desired glossmark image can only be made effective in those halftone regions in the print of a primary image where the halftone structures in the primary image can be changed significantly without visual density/color change. In solid coverage (100%) 430 and highlight (low density) 440 (see FIG. 4) regions, the glossmark print contrast is weak or near zero. In these regions, one approach as previously taught by U.S. Provisional Application No. 60/529,187 entitled "ENHANCEMENT OF GLOSSMARK IMAGES AT LOW AND HIGH DENSITIES" is to employ a clear toner which is superimposed as proscribed by desired glossmark image 620 to create clear toner structures without affecting the visual density/color of the existing primary images. The technique in one embodiment comprises application of the clear toner method of U.S. Pat. No. 6,108,512 incorporated above, in combination with the anisotropic halftone dot manipulation of differential gloss as taught above and in related patent application Ser. No. 10/159,423 referenced above. The clear toner is applied so as to be coincident with just one of the selected anisotropic halftone screens. For example, in FIG. 5, the clear toner may be applied to cover and be coincident with the edges of circle 501 in image 500. This technique is very effectively used to compliment and enhance the glossmark print to create a more nearly uniform differential gloss contrast across the whole of primary image 600 density/color ranges. In a further alternative it may be superimposed in a manner proscribed by an alternative image mark other than, and even distinctly different from, the desired glossmark image 620 to create artistic effects or enhancements to the final hardcopy print.

However, the additional teaching as provided herein is that clear toner may have Glossmark images embedded therein. As described above, the teaching of providing Glossmark images involves the manipulation by halftone selection of the microscopic surface structure, or the surface relief realized in a printed image. Experimentally, it has been observed that a light color like yellow, works as well as dark colors, e.g., black, for embedding and realizing a Glossmark image. Indeed it has been found that the surface relief from certain specified halftone structures has a similar structure, no matter what colorant is printed. This has been found to include clear toners (transparent or colorless toner and inks). Thus a clear toner layer may be similarly provided with a differential gloss pattern as described in related patent application Ser. No. 10/159,423, if the same halftone pattern manipulation as was described for use upon a color toner is employed when the clear toner is applied to a substrate, either prior to, or subsequent to the depositing of color toners. Indeed, one benefit of Glossmark techniques applied to clear toners particularly when applied prior to the application of color and black image toners, is that the planarity is improved over the more simplistic "clear toner/no clear toner" application approach employed as described in U.S. Provisional Application No. 60/529,187 which is inclined to telegraph a embossed effect through subsequently applied toner layers. This embossed effect may, or may not, be a desirable effect depending upon the customer desires and requirements.

As will be now be evident to one skilled in the art, an independent clear toner Glossmark image can thus be added to a substrate or document, either in a separate independent printing process or as printed contemporaneously with the primary content of a given document page. As such, one approach is to employ an additional toner station (a 5th station beyond CYMK) as is presently found in production machines that allow for highlight or custom colors. Thus, a clear toner image can be processed by two matched Glossmark halftone screens to embed another independent image, a Glossmark image in the clear toner layer. Since the primary content of the document can be anything, including a color image with embedded Glossmark images, there is now enabled by this technique the creation of multiple layered gloss images within a single print. One Glossmark corresponding to screen angle modulation of the color toner mass coverage (primary) and another corresponding to screen angle modulation of a subsequently applied clear toner, thus rendering multiple layered Glossmark images. There are many possible combinations of these images for different applications, especially for security printing purposes.

The technique is effective in embedding Glossmark images in blank areas. Even though clear toner is transparent, it is not difficult to see the gloss image created with the printed clear toner patterns, mainly due to the gloss difference between the paper and the toner surface. However, if the clear toner is applied only to a blank area surrounded by other colors, such as a circle drawn in a color outline, it will be very difficult to notice the existence of the clear toner. Embedding Glossmark images into such clear toner area will create very special visual effects from the graphics or images printed. Also, it will provide a new way to embed Glossmark images in certain applications, such as found in many of the line arts, which are drawn in solid coverage (100%) black 430 or other colors and are thus not suitable where the Glossmark differential gloss print contrast is weak or near zero as explained above.

For the optimal perception of a Glossmark image, it is necessary not only to control of the fusion process and the choice of materials paper and toner, but to control the amount of toner put on a substrate also. Too little toner will fail to yield sufficient pile-up for the required surface profile, while too much toner will saturate and flatten the surface and thus reduce the possible directional differential gloss for viewing Glossmark images. Adding halftone patterned clear toner to the light areas as well as any blank areas in the desired print image, can be employed to enhance the appearance of Glossmark images in these toner pile extremes. One approach for improving the perception of a Glossmark in these toner pile extremes for a given print, the amount of patterned clear toner added to the image in these areas is determined by a calibration process for the optimal perception visualization of Glossmark images. For each color combination, say CMYK, there is a certain amount of the clear toner, $T_{CMYK}$, that can be added to the print to achieve an optimal perception of Glossmark images. Therefore, for any given image, CMYK(x, y), there is a corresponding clear toner image, $T_{CMYK}(x, y)$, that can be added to the print for the Glossmark enhancement purpose. The clear toner image, $T_{CMYK}(x, y)$, should be processed by the same halftone method, as proposed previously, but now using two matched halftone screens as were used for embedding the Glossmark image into the primary image. Please note that for the purposes of this specification that "K" or "black" is considered to be a color.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate types. All such variants are intended to be encompassed by the claims which follow. These claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for the manipulation of the differential gloss in a hardcopy output comprising the steps of:
   selecting a first halftone having a first anisotropic structure orientation;
   selecting a second halftone having a second anisotropic structure orientation different from that of the first halftone;
   applying the first halftone to at least some portion of a halftone image;
   applying the second halftone to the remaining portion of the halftone image; and,
   applying a clear toner to the hardcopy output of the halftone image resulting from the above steps where a first portion of the applied clear toner is provided with a third halftone having a third anisotropic structure orientation and a remaining portion of the applied clear toner is provided with a forth halftone having a forth anisotropic structure orientation.

2. The method of claim 1 wherein the third anisotropic structure orientation and the forth anisotropic structure orientation are 90 degrees apart.

3. The method of claim 2 wherein the third anisotropic structure has a parallel orientation and the forth anisotropic structure has perpendicular orientation.

4. The method of claim 2 wherein the third anisotropic structure has a 45 degree orientation to the right and the forth anisotropic structure has a 45 degree orientation to the left.

5. The method of claim 1 wherein the third anisotropic structure orientation and the forth anisotropic structure orientation are less than 90 degrees apart.

6. The method of claim 1 wherein the first portion of the applied clear toner provided with the third halftone having the third anisotropic structure orientation, is applied substantially coincident with the first halftone.

7. The method of claim 6 wherein the first anisotropic structure orientation and the third anisotropic structure orientation are 90 degrees apart.

8. The method of claim 1 wherein the first portion of the applied clear toner provided with the third halftone having the third anisotropic structure orientation is applied as superimposed in a pattern independent from the applying of the first halftone.

9. The method of claim 6 wherein the first anisotropic structure orientation and the third anisotropic structure orientation are substantially parallel.

10. The method of claim 1 wherein the first portion of the applied clear toner provided with the third halftone having the third anisotropic structure orientation, is applied substantially coincident with the second halftone.

11. The method of claim 1 wherein the clear toner portions are applied without correspondence to where the first and second halftones are applied to the halftone image.

12. A method for the manipulation of the perceived differential gloss upon a substrate comprising the steps of:
   selecting a first halftone having a first anisotropic structure orientation;
   selecting a second halftone having a second anisotropic structure orientation different from that of the first halftone;
   applying the first halftone to a first portion of a clear toner layer deposited upon a substrate; and,
   applying the second halftone to the remaining portion of the clear toner layer deposited upon a substrate.

13. The method of claim 12 wherein the first anisotropic structure orientation and the second anisotropic structure orientation are 90 degrees apart.

14. The method of claim 13 wherein the first anisotropic structure has a 45 degree orientation to the right and the second anisotropic structure has a 45 degree orientation to the left.

15. The method of claim 12 wherein the first anisotropic structure orientation and the second anisotropic structure orientation are less than 90 degrees apart.

16. The method of claim 12 wherein the clear toner layer is covered with a subsequently applied color toner layer.

17. The method of claim 12 wherein the clear toner layer covers over a color toner layer previously applied upon the substrate.

18. A method for the manipulation of the differential gloss in a hardcopy output comprising the steps of:
   selecting a first halftone having a first anisotropic structure orientation;
   selecting a second halftone having a second anisotropic structure orientation different from that of the first halftone;
   applying the first halftone to a first portion of a first clear toner layer deposited upon a substrate;
   applying the second halftone to the remaining portion of the first clear toner layer deposited upon a substrate;
   selecting a third halftone having a third anisotropic structure orientation;
   selecting a forth halftone having a forth anisotropic structure orientation different from that of the third halftone;
   applying the third halftone to at least some first portion of a halftone image;
   applying the forth halftone to the remaining portion of the halftone image;
   applying a color toner layer representative of the halftone image comprising the third and forth halftone as deposited upon the first clear toner layer; and,
   applying a second clear toner layer to the hardcopy output of the halftone image resulting from the above steps where a first portion of the applied second clear toner layer is provided with a fifth halftone having a fifth anisotropic structure orientation and a remaining portion of the applied second clear toner layer is provided with a sixth halftone having a sixth anisotropic structure orientation.

19. The method of claim 18 wherein the first, third, and fifth, halftones have the same anisotropic structure orientation.

20. The method of claim 18 wherein the first portion of the applied second clear toner provided with the fifth halftone having the fifth anisotropic structure orientation, is applied substantially coincident with the third halftone.

21. The method of claim 18 wherein the first portion of the applied second clear toner provided with the fifth halftone having the fifth anisotropic structure orientation, is applied substantially coincident with the first portion of the halftone image.

* * * * *